US010717211B2

(12) United States Patent
Saito (10) Patent No.: US 10,717,211 B2
(45) Date of Patent: Jul. 21, 2020

(54) THREE-DIMENSIONAL IMAGE FORMING SYSTEM AND MEDIUM CONVEYING METHOD

(71) Applicant: CASIO COMPUTER CO., LTD., Shibuya-ku, Tokyo (JP)

(72) Inventor: Minoru Saito, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 551 days.

(21) Appl. No.: 15/440,285

(22) Filed: Feb. 23, 2017

(65) Prior Publication Data

US 2017/0361504 A1 Dec. 21, 2017

(30) Foreign Application Priority Data

Jun. 21, 2016 (JP) .................................. 2016-123013

(51) Int. Cl.
*B29C 35/08* (2006.01)
*B29C 35/00* (2006.01)
*B29C 31/08* (2006.01)
*B29C 61/04* (2006.01)
B29C 37/00 (2006.01)
B29L 7/00 (2006.01)

(52) U.S. Cl.
CPC .......... *B29C 35/0805* (2013.01); *B29C 31/08* (2013.01); *B29C 35/002* (2013.01); *B29C 61/04* (2013.01); *B29C 2035/0822* (2013.01); *B29C 2035/0833* (2013.01); *B29C 2037/90* (2013.01); *B29L 2007/002* (2013.01)

(58) Field of Classification Search
CPC .............. B29C 35/0805; B29C 35/002; B29C 2035/0822; B29C 2035/0833; B29C 2037/90; B29C 31/08; B29C 61/04; B29L 2007/002; B41J 3/00; B41J 11/00; B41J 29/38
See application file for complete search history.

(56) References Cited

U.S. PATENT DOCUMENTS 8,870,327 B2 10/2014 Kanamura et al.
2012/0218338 A1* 8/2012 Kanamura ............... B41J 3/407
347/15

FOREIGN PATENT DOCUMENTS

JP 5212504 B2 6/2013

* cited by examiner

*Primary Examiner* — Robert J Grun
(74) *Attorney, Agent, or Firm* — Holtz, Holtz & Volek PC (57) ABSTRACT

A three-dimensional image forming system according to the present invention includes a conveyance path along which a heat-expandable sheet is conveyed, a heating unit which heats the heat-expandable sheet by irradiating the heat-expandable sheet with light, a detection sensor which detects that the rear end of the heat-expandable sheet comes close to the heating unit by the conveyance of the heat-expandable sheet along the conveyance path, and a control unit which increases the conveying speed of the heat-expandable sheet whose rear end is detected when the detection sensor detects that the rear end of the heat-expandable sheet comes close to the heating unit.

6 Claims, 5 Drawing Sheets

THREE-DIMENSIONAL IMAGE FORMING SYSTEM AND MEDIUM CONVEYING METHOD

BACKGROUND OF THE INVENTION

1. Field of the Invention

The present invention relates to a three-dimensional image forming system and a medium conveying method.

2. Background Art

Conventionally, there has been known a three-dimensional image forming system which forms a three-dimensional image by forming an electromagnetic wave-heat conversion layer, in which an electromagnetic wave is converted to heat, on a medium (for example, a heat-expandable sheet) having an expansion layer which expands according to an amount of absorbed heat on one surface by printing and raising a region where the electromagnetic wave-heat conversion layer is formed on the medium in the expansion layer by expanding the region by irradiation with an electromagnetic wave (refer to Japanese Patent No. 5,212,504, for example).

The three-dimensional image forming system has a structure in which a gradation image, which functions as an electromagnetic wave-heat conversion layer, is formed by printing on a rear surface of a heat-expandable sheet, for example, and the rear surface of the heat-expandable sheet is irradiated with light including an electromagnetic wave having an infrared wavelength.

In addition, there have been some three-dimensional image forming systems each having a structure in which the heat-expandable sheet is fixedly held and then heated by irradiating the heat-expandable sheet with light while causing the optical heating unit to move over the heat-expandable sheet. The three-dimensional image forming system having this structure requires a fixing and holding mechanism for pressing the four ends of the heat-expandable sheet and also requires a moving mechanism for moving the optical heating unit, and therefore the system having this structure has been large-sized so as to be larger than the size of the heat-expandable sheet. Accordingly, it has been difficult to achieve a compact size or a low price with the three-dimensional image forming system having this structure. Moreover, since the three-dimensional image forming system having this structure is handled by batch processing, it cannot supply heat-expandable sheets continuously, thus requiring long time for forming a three-dimensional image on a large number of heat-expandable sheets.

Therefore, there have been some three-dimensional image forming systems each having a structure in which the optical heating unit is fixedly arranged and a guide member for guiding the heat-expandable sheet for conveyance is arranged around a heating region part for irradiating the heat-expandable sheet with light to heat the heat-expandable sheet by causing the optical heating unit to irradiate the heat-expandable sheet with light while the heat-expandable sheet is conveyed. Hereinafter, the three-dimensional image forming system having this structure will be referred to as "conventional three-dimensional image forming system."

The conventional three-dimensional image forming system, however, has a problem that uneven heating occurs on the heat-expandable sheet as described below.

For example, in the conventional three-dimensional image forming system, a guide member is arranged in a position very close to the rear surface of the heat-expandable sheet (specifically, a surface on the side irradiated with light where a gradation image, which is an electromagnetic wave-heat conversion layer, is formed). Accordingly, during conveyance of the heat-expandable sheet, a dark shadow of the guide member is cast on the rear surface of the heat-expandable sheet in some cases. Since the portion where the shadow is cast is not exposed to light, the conversion efficiency of an electromagnetic wave to heat decreases. This sometimes leads to an occurrence of uneven heating on the heat-expandable sheet. Accordingly, the conventional three-dimensional image forming system has failed in forming a good three-dimensional image in some cases.

In addition, there have been some conventional three-dimensional image forming systems where the guide member is formed of transparent glass to prevent the guide member from casting a dark shadow on the rear surface of the heat-expandable sheet. Even if the three-dimensional image forming system having this structure is used, however, water vapor generated from the expansion layer during heating is attached to the glass surface of the guide member and the glass surface is fogged with steam in some cases. This sometimes leads to an occurrence of uneven heating on the heat-expandable sheet. Accordingly, the conventional three-dimensional image forming system has failed in forming a good three-dimensional image in some cases.

Moreover, there have been some conventional three-dimensional image forming systems where the guide member is removed to prevent the guide member from casting a dark shadow on the rear surface of the heat-expandable sheet and the heat-expandable sheet is conveyed with both ends thereof held by a belt, instead. In the three-dimensional image forming system having this structure, however, the heat-expandable sheet curls during heating. The curling state is different between both ends of the heat-expandable sheet, which are held by the belt, and the central part of the heat-expandable sheet, which is made free without being held by a belt. Therefore, a difference occurs in a distance from the optical heating unit to the rear surface of the heat-expandable sheet between the ends of the heat-expandable sheet and the central part thereof. This sometimes leads to uneven heating on the heat-expandable sheet. Accordingly, the conventional three-dimensional image forming system has failed in forming a good three-dimensional image in some cases.

SUMMARY OF THE INVENTION

An object of the present invention is to eliminate uneven heating on the heat-expandable sheet.

According to an aspect of the present invention, there is provided a three-dimensional image forming system including: a conveyance path along which a heat-expandable sheet is conveyed; a heating unit which heats the heat-expandable sheet by irradiating the heat-expandable sheet with light; a detection sensor which detects that the rear end of the heat-expandable sheet comes close to the heating unit by the conveyance of the heat-expandable sheet along the conveyance path; and a control unit which increases the conveying speed of the heat-expandable sheet whose rear end is detected when the detection sensor detects that the rear end of the heat-expandable sheet comes close to the heating unit.

Furthermore, according to another aspect of the present invention, there is provided a three-dimensional image forming system including: a conveying unit which conveys a heat-expandable sheet along a conveyance path; a heating unit which heats the heat-expandable sheet by irradiating the heat-expandable sheet with light; a detection sensor which detects that the rear end of the heat-expandable sheet comes close to the heating unit; and a control unit which increases the conveying speed of the conveying unit when the detection sensor detects that the rear end of the heat-expandable sheet comes close to the heating unit.

Furthermore, according to still another aspect of the present invention, there is provided a medium conveying method including the steps of: heating a medium conveyed along a predetermined conveyance path by irradiating the medium with light from a predetermined light source; and increasing the conveying speed of the medium whose rear end is detected when a predetermined detection sensor detects that the rear end of the medium comes close to the light source.

According to the present invention, uneven heating on a heat-expandable sheet is able to be eliminated.

DETAILED DESCRIPTION OF THE PREFERRED EMBODIMENT

Modes for carrying out the present invention (hereinafter, referred to as "embodiments") will be described in detail below with reference to accompanying drawings. Note that each drawing is merely schematically shown enough to fully understand the invention. Thus, the present invention is not limited only to the illustrated examples. In each drawing, the same components or like components are denoted by the same reference numerals, and the explanation of those components will be omitted hereinafter.

(Configuration of Three-dimensional Image Forming System)

Hereinafter, the configuration of a three-dimensional image forming system 1 according to this embodiment will be described with reference to FIGS. 1, 2A, and 2B.

Figure 1:
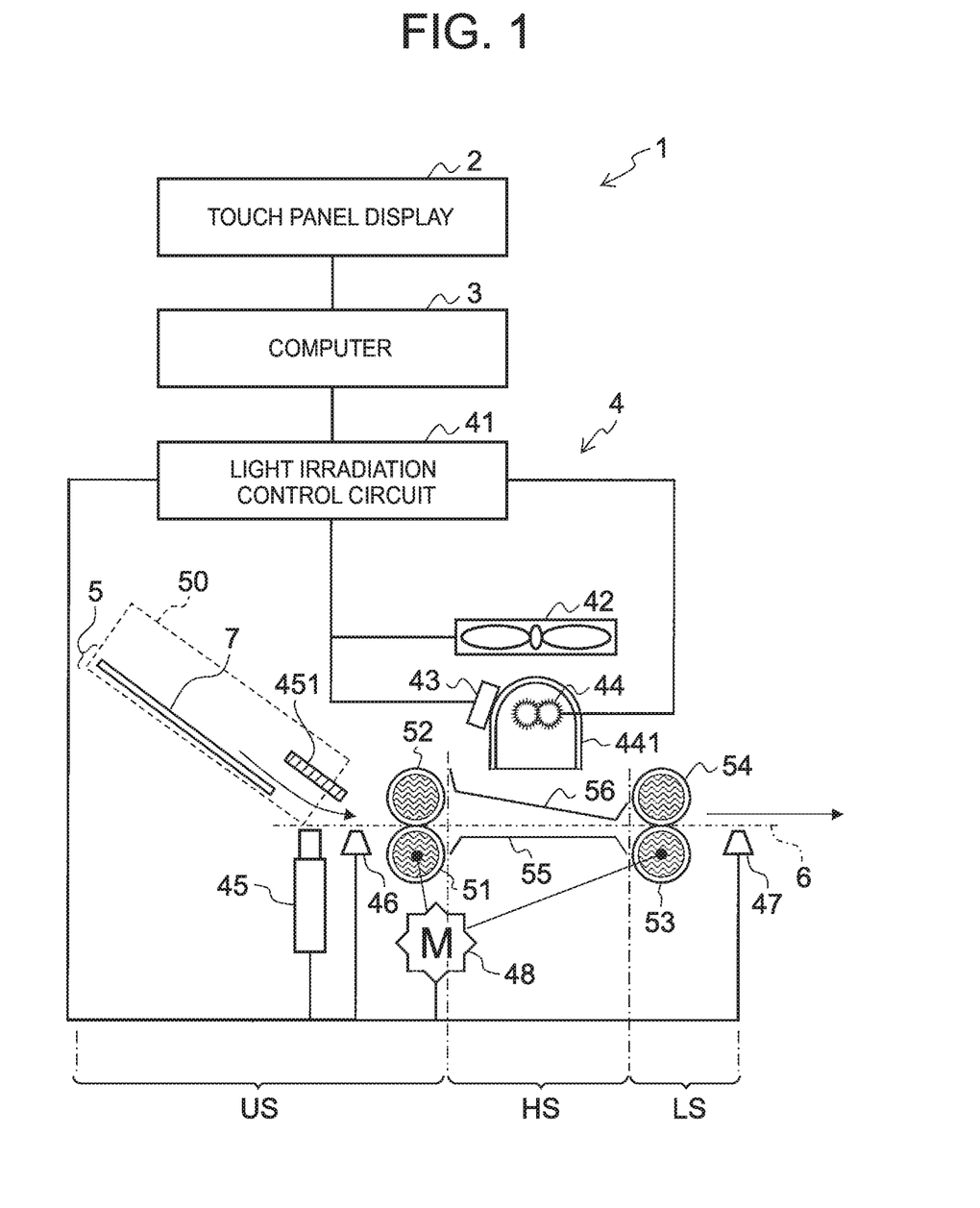
FIG. 1 is a schematic diagram showing the configuration of a three-dimensional image forming system according to an embodiment.

FIG. 1 is a schematic diagram showing the configuration of the three-dimensional image forming system 1.

Figure 2A:
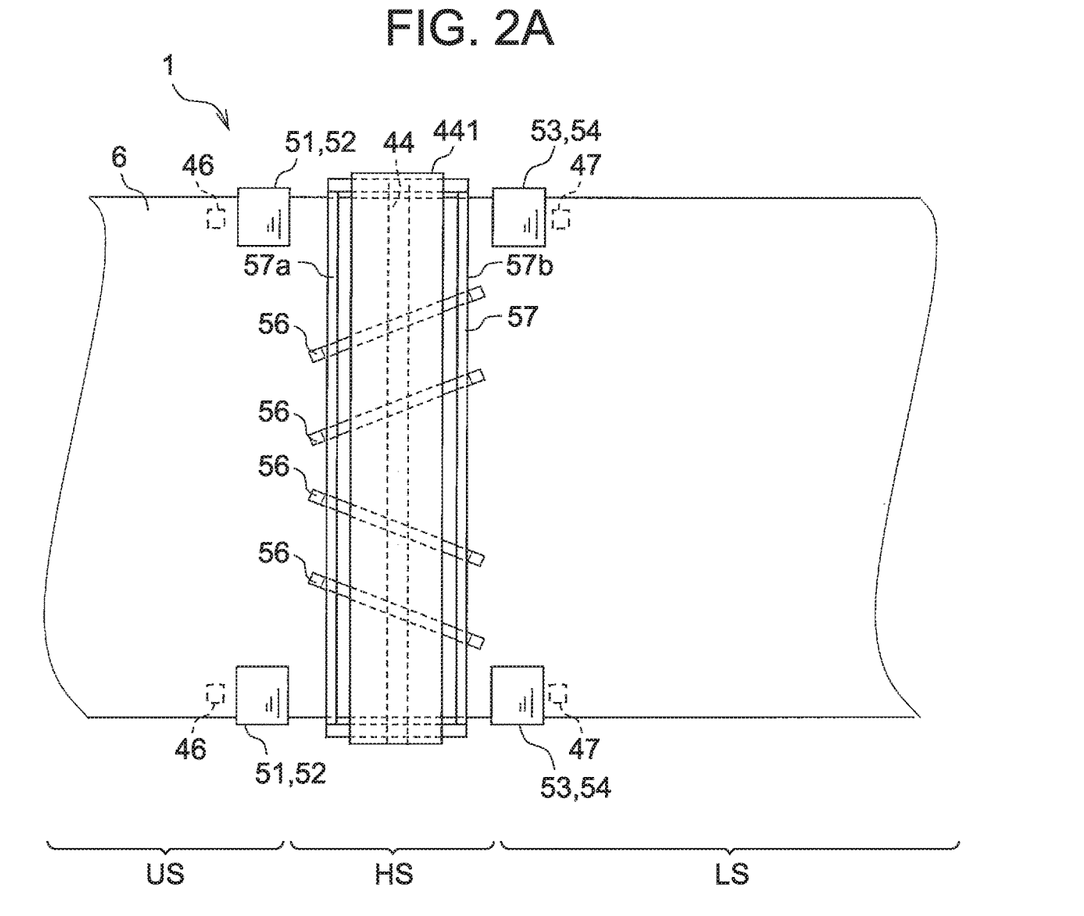
FIGS. 2A and 2B are diagrams each showing the configuration of a guide member used in the embodiment.
Figure 2B:
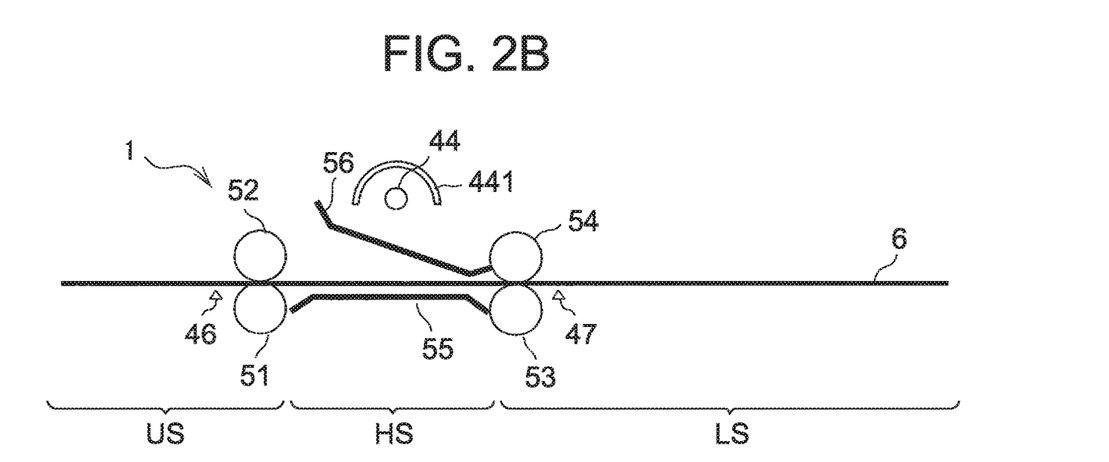

FIGS. 2A and 2B are diagrams each showing the configuration of an upper guide 56 used in this embodiment.

As shown in FIG. 1, the three-dimensional image forming system 1 according to this embodiment includes a touch panel display 2, a computer 3, and a light irradiation unit 4.

The computer 3 includes a central processing unit (CPU), a random access memory (RAM), and a storage unit, which are not shown, to control the light irradiation unit 4.

The touch panel display 2 is formed of a combination of a liquid crystal display panel and a touch panel and is used for the handling of the computer 3.

The light irradiation unit 4 is a unit which irradiates a heat-expandable sheet 7 with visible light and near infrared light while conveying the heat-expandable sheet 7. The heat-expandable sheet 7 is a medium having an expansion layer, which expands according to the amount of absorbed heat, inside. A gradation image (an electromagnetic wave-heat conversion layer) is formed by carbon black on the rear surface of the heat-expandable sheet 7. If a portion where the gradation image is formed on the heat-expandable sheet 7 is irradiated with the visible light and near infrared light, the near infrared light is converted to heat in the portion, thereby generating heat.

In response thereto, the expansion layer in the portion expands and rises and then a three-dimensional image is formed.

The light irradiation unit 4 includes a light irradiation control circuit 41, a cooling fan 42, a temperature sensor 43, a lamp heater 44, a reflective plate 441, a barcode reader 45, a mirror 451, a motor 48, insertion rollers 51 and 52, and discharge rollers 53 and 54.

The light irradiation control circuit 41 is a control unit which controls the operations of the cooling fan 42, the lamp heater 44, the insertion rollers 51 and 52, and the discharge rollers 53 and 54. The light irradiation control circuit 41 includes a CPU and a memory, which are not shown, for example, and integrally controls the light irradiation unit 4 on the basis of an instruction from the computer 3. The light irradiation control circuit 41 controls the cooling fan 42 on the basis of input signals from the barcode reader 45, an inlet sensor 46, and an outlet sensor 47.

Moreover, the light irradiation control circuit 41 controls the turning on and off of the lamp heater 44 on the basis of an input signal from the temperature sensor 43. Furthermore, the light irradiation control circuit 41 controls the rotation of the motor 48 which drives the insertion rollers 51 and 52 and the discharge rollers 53 and 54 on the basis of input signals from the barcode reader 45, the inlet sensor 46, and the outlet sensor 47.

Incidentally, the light irradiation control circuit 41 has a function of changing the conveying speed of the heat-expandable sheet 7 according to arbitrary timing.

The cooling fan 42 is a cooling unit which air-cools the reflective plate 441. The temperature sensor 43 is a measuring unit which measures the temperature of the reflective plate 441. The lamp heater 44 is a member which generates visible light and near infrared light.

In this embodiment, description will be made assuming that the lamp heater 44 is formed of a halogen lamp. The reflective plate 441 is a member which reflects the visible light and near infrared light generated by the lamp heater 44.

The lamp heater 44 and the reflective plate 441 function as a heating unit which irradiates the heat-expandable sheet 7 with visible light and near infrared light to heat the portion where a gradation image (an electromagnetic wave-heat conversion layer) is formed on the heat-expandable sheet 7 with near infrared light.

In this embodiment, description will be made assuming that the heating unit (the lamp heater 44 and the reflective plate 441) is arranged above a conveyance path 6. Note that, however, the heating unit (the lamp heater 44 and the reflective plate 441) is also allowed to be arranged under the conveyance path 6.

The barcode reader 45 is a device which reads a barcode printed at the end part of the rear surface of the heat-expandable sheet 7.

When the rear surface of the heat-expandable sheet 7 is placed in a paper feed unit 50 so as to face upward, the mirror 451 reflects the barcode on the heat-expandable sheet 7 so that the barcode reader 45 is able to read the barcode.

The reading of the barcode by the barcode reader 45 enables the three-dimensional image forming system 1 to distinguish between the front surface and the rear surface of the heat-expandable sheet 7.

The motor 48 is a drive source for the insertion rollers 51 and 52 and the discharge rollers 53 and 54.

The insertion rollers 51 and 52 are conveying units arranged on the upstream side of the heating unit (the lamp heater 44 and the reflective plate 441).

The discharge rollers 53 and 54 are conveying units arranged on the downstream side of the heating unit (the lamp heater 44 and the reflective plate 441).

In the inside of the light irradiation unit 4, the conveyance path 6 indicated by a dashed-dotted line is formed. The conveyance path 6 is formed from an insertion unit 5 into which the heat-expandable sheet 7 is inserted to a discharge unit (not shown) from which the heat-expandable sheet 7 is discharged. In the inside of the insertion unit 5, the paper feed unit 50 is arranged. The light irradiation unit 4 includes the paper feed unit 50, the inlet sensor 46, the insertion rollers 51 and 52, a lower guide 55, an upper guide 56, the discharge rollers 53 and 54, and the outlet sensor 47 along the conveyance path 6.

The paper feed unit 50 is a portion which supplies the heating unit with the heat-expandable sheet 7. When the heat-expandable sheet 7 is inserted from the insertion unit 5 into the inside and placed in the paper feed unit 50 and the touch panel display 2 instructs the light irradiation unit 4 to irradiate the heat-expandable sheet 7 with light, the light irradiation unit 4 starts the conveyance of the heat-expandable sheet 7 and the light irradiation thereof. This conveyance is started by a conveying mechanism not shown and included by the paper feed unit 50.

The inlet sensor 46 is a detection sensor which detects the heat-expandable sheet 7. The inlet sensor 46 detects that the front end of the heat-expandable sheet 7 has reached a position just before the insertion rollers 51 and 52 and that the rear end of the heat-expandable sheet 7 has passed through the position just before the insertion rollers 51 and 52.

The insertion rollers 51 and 52 are provided on both sides of the conveyance path 6, respectively, and hold the end part of the heat-expandable sheet 7 from the upper and lower sides for conveyance. These insertion rollers 51 and 52 are connected to the motor 48 via a power transmission mechanism not shown and driven by the motor 48.

The lower guide 55 and the upper guide 56 are guide members which guide the heat-expandable sheet 7 so as to be conveyed.

In this embodiment, the lower guide 55 and the upper guide 56, each of which has a long and flat plate shape, guide the heat-expandable sheet 7 from the lower and upper sides of the conveyance path 6.

The lower guide 55 has a shape in which the front end part and the rear end part are bent downward so as not to interfere with the conveyance of the heat-expandable sheet 7.

The lower guide 55 is preferably made of robust metal material. Moreover, the upper guide 56 has a shape in which the front end part and the rear end part bent upward so as not to interfere with the conveyance of the heat-expandable sheet 7. The upper guide 56 is preferably made of transparent glass or plastic material or the like.

In this embodiment, the front end and the rear end of the lower guide 55 and the upper guide 56 are based on the heat-expandable sheet 7 which is a conveyance medium.

In the shown example, the side closer to the discharge rollers 53 and 54 (specifically, the downstream side in the conveying direction) corresponds to the front end side of the lower guide 55 and the upper guide 56, and the side closer to the insertion rollers 51 and 52 (specifically, the upstream side in the conveying direction) corresponds to the rear end side of the lower guide 55 and the upper guide 56.

The discharge rollers 53 and 54 hold the heat-expandable sheet 7 from the upper and lower sides for conveyance. These discharge rollers 53 and 54 are also connected to the motor 48 via a power transmission mechanism not shown and driven by the motor 48.

Similarly to the inlet sensor 46, the outlet sensor 47 is a detection sensor for detecting the heat-expandable sheet 7. The outlet sensor 47 detects that the front end of the heat-expandable sheet 7 has reached the position just after the discharge rollers 53 and 54 and that the rear end of the heat-expandable sheet 7 has passed through the position just after the discharge rollers 53 and 54.

The mechanism of the inside of the light irradiation unit 4 is roughly classified into a heating region part HS for heating the heat-expandable sheet 7 just under the heating unit (the lamp heater 44 and the reflective plate 441), an upstream mechanism part US on the upstream side of the heating region part HS, and a downstream mechanism part LS on the downstream side of the heating region part HS.

As shown in FIG. 2A, the upper guide 56 is composed of four long and plate-like members and is fixedly supported by a support member 57 in this embodiment. In this embodiment, the support member 57 includes two rods 57a and 57b arranged in parallel with each other in the width direction of the conveyance path 6 and has a structure of supporting the four upper guides 56 with the two rods 57a and 57b. In addition, each upper guide 56 is provided inclined in an oblique direction in a top view.

Specifically, the upper guide 56 is arranged inclined so that the front end side faces the outer side of the conveyance path 6 and the rear end side faces the center side of the conveyance path 6. The reason for this arrangement is to spread the front end part of the heat-expandable sheet 7, which has curled up after passing through between the insertion rollers 51 and 52, in the direction of the outside of the conveyance path 6 (specifically, to guide the front end part of the heat-expandable sheet 7 in a direction in which both corners of the front end part are separated from each other) and to eliminate uneven heating of the heat-expandable sheet 7 according to the principle described below.

Specifically, on condition that the respective upper guides 56 are arranged in parallel with each other in the conveying direction in a top view in the structure, the upper guides 56 cast linear shadows parallel to each other in the conveying direction on the rear surface of the heat-expandable sheet 7. The shadows are formed in such a way as to extend in the conveying direction. Therefore, even if the heat-expandable sheet 7 is conveyed, the shadows are continuously cast in the same positions on the rear surface of the moving heat-expandable sheet 7.

Accordingly, uneven heating is likely to occur on the heat-expandable sheet in this structure. Therefore, in this embodiment, the upper guides 56 are provided inclined in an oblique direction in a top view to prevent the upper guides 56 from continuously casting the shadows in the same positions on the rear surface of the moving heat-expandable sheet 7 when the heat-expandable sheet 7 is conveyed (specifically, so that the shadows are cast in different positions). Thereby, the three-dimensional image forming system 1 is able to eliminate uneven heating of the heat-expandable sheet 7.

Moreover, as shown in FIG. 2B, each upper guide 56 is provided inclined in an oblique direction in a side view.

Specifically, the upper guide 56 is arranged inclined so that the rear end is separated from the conveyance path 6 between the conveyance path 6 and the heating unit (the lamp heater 44 and the reflective plate 441).

The reason for this arrangement is to successfully guide the front end part of the heat-expandable sheet 7, which has curled up after passing through between the insertion rollers 51 and 52, toward a nip part between the discharge rollers 53 and 54 and to eliminate uneven heating of the heat-expandable sheet 7 according to the principle described below.

Specifically, on condition that the respective upper guides 56 are arranged in a horizontal direction at the same height in a side view in the structure (in other words, the upper guides 56 are arranged in parallel with each other at the same height as the conveyance path 6), the distance between the upper guides 56 just under the lamp heater 44 and the rear surface of the heat-expandable sheet 7 is small and therefore the upper guides 56 cast dark shadows thereof on the rear surface of the heat-expandable sheet 7.

Accordingly, uneven heating is likely to occur on the heat-expandable sheet in this structure.

Therefore, in this embodiment, the upper guides 56 are provided inclined in an oblique direction at the same height and at the same inclination angle in a side view to separate the upper guides 56 just under the lamp heater 44 from the rear surface of the heat-expandable sheet 7 to ease the shadows of the upper guides 56 cast on the rear surface of the heat-expandable sheet 7 (in other words, to decrease the thickness of the shadows of the upper guides 56).

Thereby, the three-dimensional image forming system 1 is able to equalize the conversion efficiency to near infrared light on almost whole surface of the heat-expandable sheet 7. Accordingly, the three-dimensional image forming system 1 is able to eliminate uneven heating of the heat-expandable sheet 7.

In this embodiment, when the rear end of the heat-expandable sheet 7 passes through between the insertion rollers 51 and 52, the rear end part of the heat-expandable sheet 7 curls upward (see FIG. 4C) since the upper guides 56 are provided inclined in an oblique direction in a side view. The result shows that the rear end part of the heat-expandable sheet 7 comes close to the optical heating unit (the lamp heater 44 and the reflective plate 441).

Figure 4A:
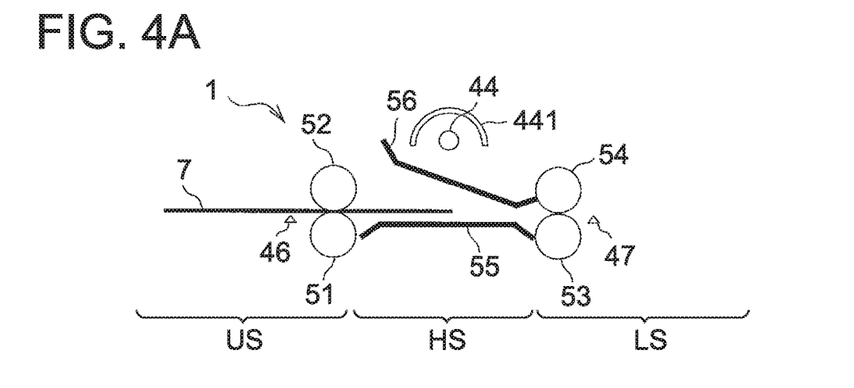
FIGS. 4A to 4D are explanatory diagrams each showing a medium conveying method for the three-dimensional image forming system according to the embodiment.
Figure 4B:
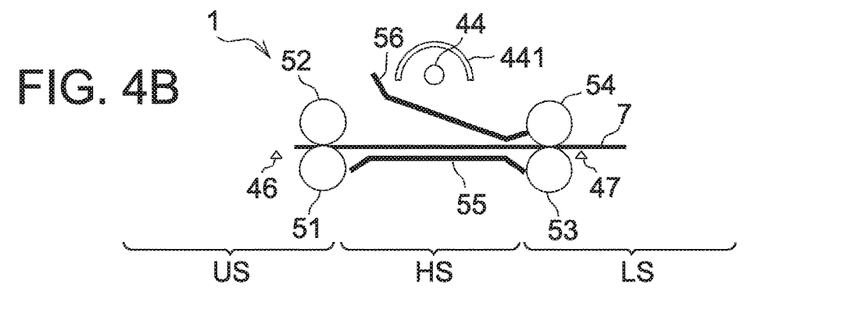
Figure 4C:
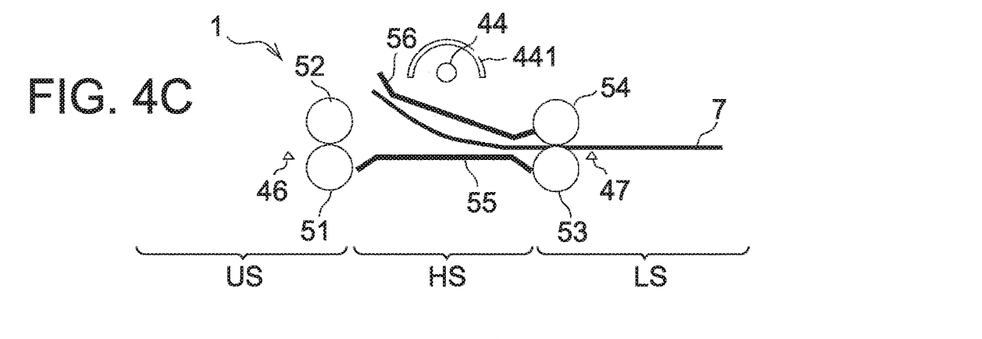

At this time, the light amount of near infrared light per unit area radiated to the rear end part of the heat-expandable sheet 7 increases to be larger than the light amount of near infrared light radiated to other portions.

Therefore, only the rear end part of the heat-expandable sheet 7 is heated strongly, by which uneven heating easily occurs in the rear end part of the heat-expandable sheet 7.

Moreover, since the pressing forces of the insertion rollers 51 and 52 to the heat-expandable sheet 7 are removed, a curl easily occurs in the rear end part of the heat-expandable sheet 7.

Therefore, the three-dimensional image forming system 1 conveys a medium in a method described in the following chapter titled "Medium Conveying Method in Three-dimensional Image Forming System" in order to prevent occurrences of these phenomena.

(Medium Conveying Method in Three-dimensional Image Forming System)

Hereinafter, a description will be made on a medium conveying method in the three-dimensional image forming system 1 with reference to FIGS. 3 and 4A to 4D.

Figure 3:
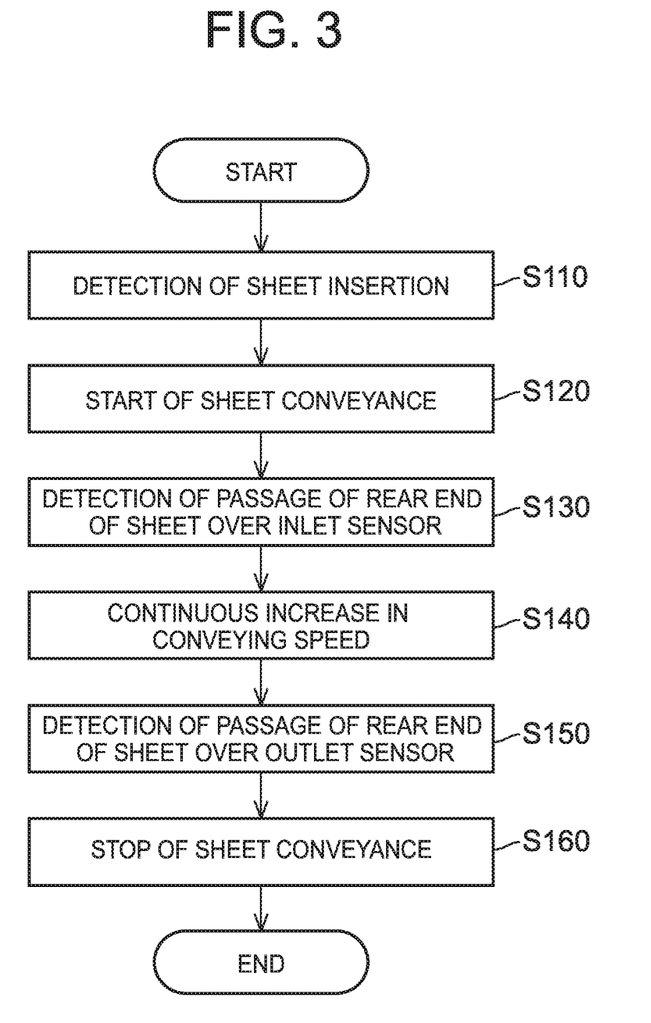
FIG. 3 is a flowchart showing an operation of the three-dimensional image forming system according to the embodiment.

FIG. 3 is a flowchart showing an operation of the three-dimensional image forming system 1.

FIGS. 4A to 4D are explanatory diagrams each showing a medium conveying method in the three-dimensional image forming system 1.

In this embodiment, the light irradiation control circuit 41 functions as a heating control unit which controls the operation of the heating unit (the lamp heater 44 and the reflective plate 441) and as a conveyance control unit which controls the operation of the conveying unit (the insertion rollers 51 and 52 and the discharge rollers 53 and 54). Moreover, the inlet sensor 46 functions as a rear end detection sensor which detects that the rear end of the heat-expandable sheet 7 comes close to the optical heating unit.

The three-dimensional image forming system 1 operates on the basis of the time measured by a timer not shown.

Moreover, the operation of the three-dimensional image forming system 1 is specified by a program which is previously stored in a storage unit not shown in the light irradiation control circuit 41 in a freely readable state.

Since these issues are common parts in information processing, the detailed description thereof will be omitted hereinafter.

The three-dimensional image forming system 1 starts the operation in response to actions taken by an operator, i.e. inserting the heat-expandable sheet 7 (paper) from the insertion unit 5 and placing it in the paper feed unit 50 and then depressing (tapping) a start button (not shown) displayed on the touch panel display 2.

As shown in FIG. 3, the light irradiation control circuit 41 of the three-dimensional image forming system 1 detects the insertion of the heat-expandable sheet 7 by the barcode reader 45 (step S110). At this time, the light irradiation control circuit 41 distinguishes between the front surface and the rear surface of the heat-expandable sheet 7 on the basis of an output signal from the barcode reader 45.

If the heat-expandable sheet 7 is placed in such a way that the rear surface thereof faces upward, the light irradiation control circuit 41 drives the motor 48 to cause the insertion rollers 51 and 52 and the discharge rollers 53 and 54 to start the conveyance of the heat-expandable sheet 7 (step S120).

Thereby, the tip part of the heat-expandable sheet 7 passes over the inlet sensor 46 and then enters the heating region part HS from the upstream mechanism part US.

FIG. 4A shows this state. At this time, in the heating region part HS, the rear surface of the heat-expandable sheet 7 is irradiated with visible light and near infrared light, by which a three-dimensional image is formed on the heat-expandable sheet 7.

Thereafter, the heat-expandable sheet 7 is further conveyed, and thereupon the rear end of the heat-expandable sheet 7 passes over the inlet sensor 46.

FIG. 4B shows this state. The light irradiation control circuit 41 detects that the rear end of the heat-expandable sheet 7 passes over the inlet sensor 46 on the basis of an output signal from the inlet sensor 46 (step S130).

Thereafter, the rear end of the heat-expandable sheet 7 passes between the insertion rollers 51 and 52, and thereupon the rear end part of the heat-expandable sheet 7 curls upward since the upper guides 56 are provided inclined in an oblique direction in a side view as described above.

FIG. 4C shows this state. Consequently, the rear end part of the heat-expandable sheet 7 comes close to the optical heating unit (the lamp heater 44 and the reflective plate 441).

At this time, the light amount of near infrared light per unit area radiated to the rear end part of the heat-expandable sheet 7 increases to be larger than the light amount of near infrared light radiated to other portions.

Therefore, only the rear end part of the heat-expandable sheet 7 is heated strongly, by which uneven heating easily occurs in the rear end part of the heat-expandable sheet 7.

Moreover, since the pressing forces of the insertion rollers 51 and 52 to the heat-expandable sheet 7 are removed, a curl easily occurs in the rear end part of the heat-expandable sheet 7.

Therefore, the light irradiation control circuit 41 performs continuous increase control in the conveying speed of the insertion rollers 51 and 52 and the discharge rollers 53 and 54 so that the light amount of near infrared light per unit area radiated to the rear end part of the heat-expandable sheet 7 approximates the light amount of near infrared light radiated to other portions (step S140).

At this time, the light irradiation control circuit 41 continuously increases the conveying speed at an accelerated rate so that the conveying speed increases by several percent for every several seconds, for example. Thereby, the three-dimensional image forming system 1 is able to irradiate the rear end part of the heat-expandable sheet 7 and other portions thereof with near infrared light of roughly equivalent light amount per unit area.

This type of three-dimensional image forming system 1 is able to prevent strong heating of only the rear end part of the heat-expandable sheet 7 and to prevent an occurrence of curl in the rear end part of the heat-expandable sheet 7. Accordingly, the three-dimensional image forming system 1 is able to form a substantially uniform three-dimensional image between the rear end part of the heat-expandable sheet 7 and other portions thereof.

Figure 4D:
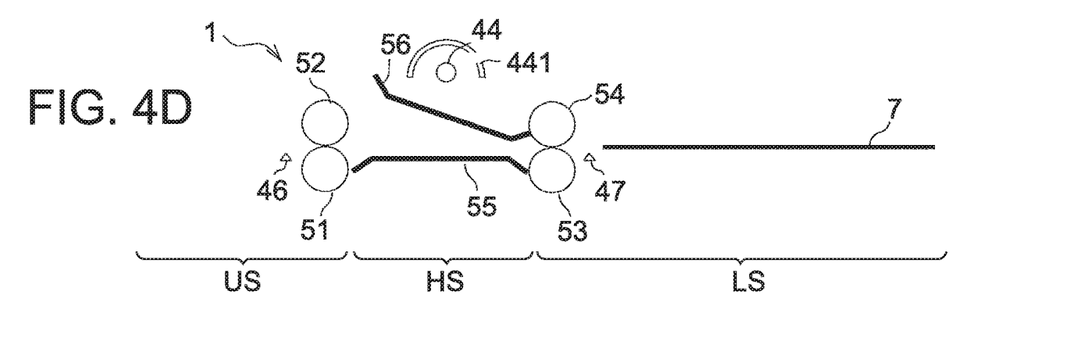

Thereafter, when the heat-expandable sheet 7 is further conveyed, the rear end of the heat-expandable sheet 7 passes over the outlet sensor 47.

FIG. 4D shows this state. The light irradiation control circuit 41 detects that the rear end of the heat-expandable sheet 7 has passed over the outlet sensor 47 on the basis of an output signal from the outlet sensor 47 (step S150).

In response thereto, the light irradiation control circuit 41 stops the insertion rollers 51 and 52 and the discharge rollers 53 and 54 to stop the conveyance of the heat-expandable sheet 7 (step S160).

Thereby, a series of routine operations are completed.

The three-dimensional image forming system 1, however, is also able to form a three-dimensional image on both surfaces of the heat-expandable sheet 7 by irradiating the surfaces of the heat-expandable sheet 7 with near infrared light.

In this case, in the three-dimensional image forming system 1, the rear end part of the heat-expandable sheet 7 behaves differently according to whether the expansion is made on the rear surface side or on the front surface side. In this type of three-dimensional image forming system 1, the rear end part of the heat-expandable sheet 7 is conveyed along the lower guide 55 in some cases depending on the direction of a curl that occurs in the heat-expandable sheet 7.

Therefore, the three-dimensional image forming system 1 is likely to control the conveyance so as not to increase the conveying speed when forming a three-dimensional image on both surfaces of the heat-expandable sheet 7.

(Main Characteristics of Three-dimensional Image Forming System)

In this configuration, the three-dimensional image forming system 1 according to this embodiment has the characteristics described below.

(1) In the three-dimensional image forming system 1, the upper guides 56 are provided inclined in an oblique direction in a side view (see FIG. 2B).

In this type of three-dimensional image forming system 1, the upper guides 56 just under the lamp heater 44 are separated from the rear surface of the heat-expandable sheet 7 to ease the shadows of the upper guides 56 cast on the rear surface of the heat-expandable sheet 7 (in other words, to decrease the thickness of the shadows of the upper guides 56).

Thereby, the three-dimensional image forming system 1 is able to equalize the conversion efficiency to near infrared light on almost whole surface of the heat-expandable sheet 7. Accordingly, the three-dimensional image forming system 1 is able to eliminate uneven heating of the heat-expandable sheet 7.

(2) The three-dimensional image forming system 1 continuously increases the conveying speed of the heat-expandable sheet 7 at an accelerated rate at the timing when the rear end part of the heat-expandable sheet 7 has passed over the inlet sensor 46 (in other words, at the timing when the rear end part of the heat-expandable sheet 7 enters the heating region part HS departing from the insertion rollers 51 and 52).

Thereby, the three-dimensional image forming system 1 prevents strong heating of only the rear end part of the heat-expandable sheet 7 and an occurrence of curl in the rear end part of the heat-expandable sheet 7, both of which are caused by the behavior of the heat-expandable sheet 7.

Accordingly, the three-dimensional image forming system 1 is able to form a substantially uniform three-dimensional image between the rear end part of the heat-expandable sheet 7 and other portions thereof.

(3) The three-dimensional image forming system 1 is able to be reduced in size since it has a simple structure in which the optical heating unit is arranged fixed.

Moreover, the handling of the three-dimensional image forming system 1 is only depressing (tapping) the start button (not shown) displayed on the touch panel display 2 after an operator inserts the heat-expandable sheet 7 from the insertion unit 5.

This type of three-dimensional image forming system 1 is able to be widely spread.

As described hereinabove, the three-dimensional image forming system 1 according to this embodiment is able to eliminate uneven heating of a heat-expandable sheet.

The present invention is not limited to the above embodiments, and various modifications and variations may be made without departing from the spirit and scope of the present invention.

For example, the above embodiments have been described in detail for better understanding of the spirit and scope of the present invention. Therefore, the present invention is not always limited to the structure having all constituent elements described above.

Furthermore, a constituent element may be added to another constituent element or some constituent elements may be changed to other constituent elements in the present invention. Moreover, several constituent elements may be omitted in the present invention.

Figure 5A:
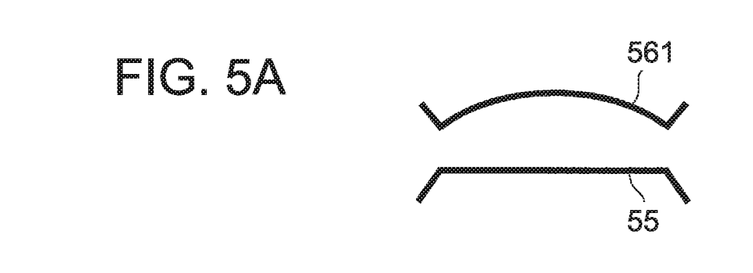
FIGS. 5A to 5C are diagrams each showing a variation of an upper guide used in the embodiment.
Figure 5B:
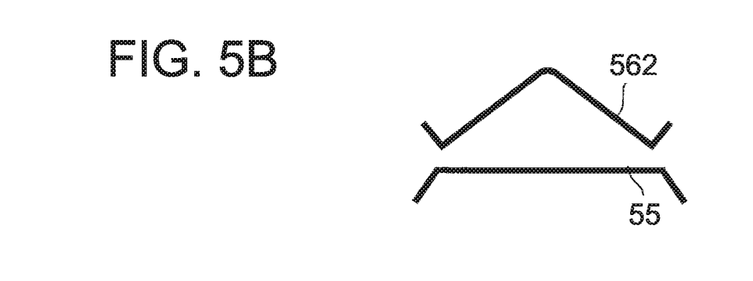
Figure 5C:
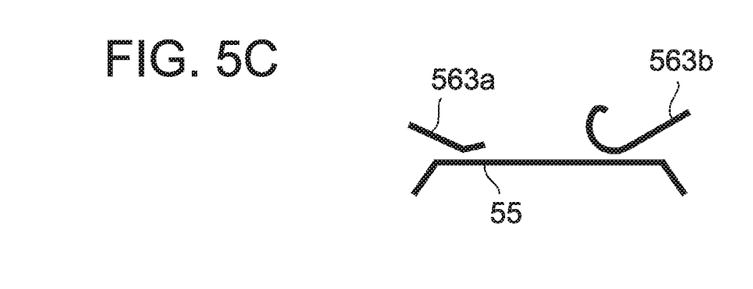

In addition, the embodiments have been described by giving an example that the upper guides 56 are members each having a long and flat plate shape, for example. The upper guides 56, however, may be modified as in the variations shown in FIG. 5, for example.

FIGS. 5A to 5C are diagrams showing upper guides 561, 562, and 563a and 563b as variations of the upper guide 56.

In the example shown in FIG. 5A, the upper guide 561 has a long and flat plate whose central part is curved in an upward arc shape so as to successfully guide the front end part of the heat-expandable sheet 7, which has curled up after passing through between the insertion rollers 51 and 52, toward a nip part between the discharge rollers 53 and 54 and has a front end part and a rear end part bent upward so as not to interfere with the conveyance of the heat-expandable sheet 7.

In the example shown in FIG. 5B, the upper guide 562 has a long and flat plate whose central part is curved in an upward convex shape so as to successfully guide the front end part of the heat-expandable sheet 7, which has curled up after passing through between the insertion rollers 51 and 52, toward a nip part between the discharge rollers 53 and 54 and has a front end part and a rear end part bent upward so as not to interfere with the conveyance of the heat-expandable sheet 7.

In the example shown in FIG. 5C, the upper guide has a structure that it is divided into an upper guide 563a on the upstream side and an upper guide 563b on the downstream side.

The upper guide 563a has a shape in which the front end part of a long and flat plate is bent upward so as not to interfere with the conveyance of the heat-expandable sheet 7. In this arrangement, a portion other than the front end part of the flat plate declines as advancing to the downstream side, and the front end part of the flat plate inclines as advancing to the downstream side.

On the other hand, the upper guide 563b has a shape in which the rear end part of a long and flat plate is curled and a portion other than the rear end part of the flat plate inclines as advancing to the downstream side so as not to interfere with the conveyance of the heat-expandable sheet 7.

In addition, the medium conveying method described in the chapter titled "Medium Conveying Method in Three-dimensional Image Forming System" is not only applicable to the three-dimensional image forming system 1, but also to various systems or devices.

In this case, the heating unit can be modified to a processing execution unit which performs arbitrary processing for a medium.

Specifically, it is assumed that the device includes a conveying unit for conveying a medium, a processing execution unit for performing arbitrary processing for the medium, and a control unit for controlling the operation of the conveying unit and that the conveying unit includes an upstream mechanism part arranged on the upstream side of the processing execution unit and a downstream mechanism part arranged on the downstream side of the processing execution unit.

In the medium conveying method according to the present invention, the control unit may increase the conveying speed of the conveying unit when the rear end of the medium departs from the upstream mechanism part in the device.

What is claimed is:

1. A three-dimensional image forming system comprising:
    a conveyance path along which a heat-expandable sheet provided with a photothermal conversion layer is conveyed;
    a light source which irradiates light to a predetermined first region in the conveyance path;
    a first roller pair comprising a first roller and a second roller, the first roller pair being arranged so that the heat-expandable sheet passes between the first roller and the second roller before the heat-expandable sheet passes through the first region;
    a second roller pair comprising a third roller and a fourth roller, the second roller pair being arranged so that the heat-expandable sheet passes between the third roller and the fourth roller after the heat-expandable sheet passes through the first region;
    a controller configured to control a conveying speed of the heat-expandable sheet by controlling rotating speeds of the first roller and the third roller via a motor which rotationally drives the first roller and the third roller; and
    a sensor which is arranged in a vicinity of an upstream side of the first roller pair corresponding to a detection target position of the heat-expandable sheet in the conveyance path,
    wherein the controller is configured to increase the conveying speed of the heat-expandable sheet by increasing the rotating speed of at least one of the first roller and the third roller via the motor when it is detected, based on an output signal from the sensor, that a rear end of the heat-expandable sheet has passed through the detection target position.

2. The three-dimensional image forming system according to claim 1, further comprising:
    a guide member which is arranged between the second roller pair and the first roller pair so as to correspond to the first region, and which guides the heat-expandable sheet,
    wherein the guide member is inclined so that an end thereof on the first roller pair side is more separated from the conveyance path toward the light source than an end thereof on the second roller pair side.

3. The three-dimensional image forming system according to claim 1, further comprising:
    a guide member which is arranged between the second roller pair and the first roller pair so as to correspond to the first region, and which guides the heat-expandable sheet,
    the guide member is inclined so that, in accordance with an increase in distance away from the first roller pair toward the second roller pair, the guide member is more separated from the light source toward the conveyance path.

4. The three-dimensional image forming system according to claim 1, wherein the first roller pair is arranged in a vicinity of the first region.

5. The three-dimensional image forming system according to claim 1, wherein the second roller pair is arranged in a vicinity of the first region.

6. The three-dimensional image forming system according to claim 1, wherein the controller increases the conveying speed of the heat-expandable sheet so that an amount of light per unit area radiated to the rear end of the heat-expandable sheet approximates an amount of light radiated to other portions of the heat-expandable sheet.

* * * * *